United States Patent [19]

Duke

[11] Patent Number: 5,787,640
[45] Date of Patent: Aug. 4, 1998

[54] COATING FUZZY COTTONSEED

[76] Inventor: Gene L. Duke, Box 988, Brownfield, Tex. 79316

[21] Appl. No.: 938,960

[22] Filed: Sep. 1, 1992

[51] Int. Cl.$^6$ .............................. A01H 5/00; A01H 5/10; A01G 7/00
[52] U.S. Cl. ................................ 47/57.6; 47/58; 800/200
[58] Field of Search ........................... 47/57.601, 57.612, 47/57.617, 57.618, 58, DIG. 9; 800/200, DIG. 27, DIG. 63

[56] References Cited

U.S. PATENT DOCUMENTS

| 181,136 | 1/1876 | Brandriff . | |
|---|---|---|---|
| 3,698,133 | 10/1972 | Schreiber | 47/57.6 |
| 3,911,183 | 10/1975 | Hinkes | 428/15 |
| 4,067,141 | 1/1978 | Matsunaga | 47/57.6 |
| 4,250,660 | 2/1981 | Kitamura | 47/57.6 |
| 4,735,015 | 4/1988 | Schmolka | 47/57.6 |
| 4,779,376 | 10/1988 | Redenbaugh | 47/57.6 |

OTHER PUBLICATIONS

James K. Seaman, Celanese Plastics and Specialties Company Chapter 6, GuarGum –No Other information known.
Rhone–Poulenc–World's Leading Producer of Water Soluble Polymers –1992.

*Primary Examiner*—Elizabeth F. McElwain

[57] ABSTRACT

Fuzzy cotton seed is coated to produce a flowable product which is more easily transported and handled and also may be planted by the same planting equipment that is used to plant other seeds, such as corn and beans. The coating process includes first wetting the seed with a solution of a guar derivative such as hydroxypropyl guar. Then the wetted seed is mixed with an excess of a dry powdered guar product, the excess powder screened off, and the coated seed dried.

11 Claims, 1 Drawing Sheet

COATING FUZZY COTTONSEED

CROSS REFERENCE TO RELATED APPLICATION

None. however, Applicant filed Disclosure Document Number 263,633 on Sep. 28, 1990, which document concerns this application; therefore, by separate paper it is respectfully requested that the document be retained and acknowledgment thereof made by the Examiner. (MoPEP 1706)

BACKGROUND OF THE INVENTION

(1) Field of the Invention

This invention relates to the preparation of cottonseed for planting purposes.

(2) Description of the Related Art

The majority of the cotton grown in the United States is Upland cotton which has naturally fuzzy seed. That is, when the cotton is ginned the seed are not thoroughly and completely delinted but are left "fuzzy", that is to say that lint covers the seed cotton. When the term cottonseed is used herein it will be understood that what is meant is naturally fuzzy cottonseed. The fuzzy cottonseed which are an important by-product of the ginning process, are usually processed and used in one of three ways.

Most of the cottonseed have oil extracted from them; the residue in the form of meal is sold for cattle feed. Before the extraction of oil, the seed are partially delinted, usually by a saw process. The lint thus removed is baled and sold through regular channels of trade. The product is known as "linters" which are normally used in various chemical processes as a source of cellulose and as stuffing for upholstery and making of felt.

Since the middle 1970's a large volume of gin-run fuzzy seed has been sold to the beef and dairy industry for feed without additional processing or conditioning.

The third major use of cottonseed is for planting for reproduction purposes. Over the years, from the time cotton was first mechanically planted, farmers have had to contend with the short fuzz or lint that remains on the seed after ginning, thus making the seed difficult to plant through a mechanical planter.

The early stages of mechanically planting fuzzy cottonseed included various planter designs. After the development of acid delinting of cottonseed and the commercial acceptance of acid delinted cottonseed, these early designs gave way to the standard design used for planting most other crops, such as corn and beans.

Various techniques have been developed to remove the fuzz from seed coat so the seed will flow, like beans, corn, grain, etc., through a planter, holding bin, or pour out of a sack. Some of the various techniques used and developed are listed below.

a. A saw delinting process which includes a close saw cut which leaves some fuzz and some mechanical damage and nicks in the seed coat.

b. A flame delinting process which leaves more lint on the seed than does saw delinting.

c. An acid delinting process with sulphuric acid or wet acid delinting which removes 100% of the lint from the seed coat, however, this process has been almost totally banned due to the high volume of waste acid polluting surface water and underground water.

d. An anhydrous hydrochloric acid delinting process commonly called dry acid delinting, which likewise removes 100% of the lint but leaves a small amount of HCl on the seed coat; this acid is later naturalized with anhydrous ammonia. This process removed the problem of surface water and underground water pollution, but has an air pollution problem as excess HCl and ammonia are vented into the air and come together to form clouds of ammonium chloride in the atmosphere. Where scrubbers are used to strip these elements out of the air, the waste from the scrubbers creates a disposal problem and water pollution. Prior to 1972, the lint from this process led to heavy air pollution as the main method of its disposal was by burning. Applicant herein invented a process that would eliminate the need for burning which was patented as U.S. Pat. No. 4,055,680 on Oct. 25, 1977.

e. A recently developed process which is the least polluting but expensive to construct, is the dilute $H_2SO_4$ process where the fuzzy seed are mixed in a dilute solution of sulphuric acid, then dried and buffed to remove the lint. There is also a lint disposal problem.

f. A buffing or carding process designed to remove the lint from cottonseed thus eliminating the use of acid.

In 1876, the BRANDIFF U.S. Pat. No. 181,136 described coating the cottonseed for planting with a coating of silicate or soda or silicate of potash or other soluble silicate. It appears from the description that the process was basically a glue to glue the fibers against the seed coat.

Also, HINKES U.S. Pat. No. 3,911,183 and SCHMOLKA U.S. Pat. No. 4,735,015 describe film or the like covering cottonseed.

SCHREIBER, U.S. Pat. No. 3,698,133 discloses using a plurality of soluble particulate material such as sandy loam, powdered talc, ground limestone, powdered charcoal, powdered silica, gypsum, powdered feldspar, powdered vermiculite, kaolin and ground peat moss. There is indication that the coating would be very thin because it states that the maximum particle size of the coating material must not exceed the desired thickness of the coating. There are several binders indicated for the coating including karaya gum, jaguar gum, tragacanth gum, and polysaccharide gum. As applicant understands the SCHREIBER disclosure, the purpose of this was to delay germination of the seed.

REDENBAUGH, U.S. Pat. No. 4,779,376 discloses an extensive laundry list or catalogue of many different coating materials and also an extensive list of adjuvants which might be included in the coating. Guar gum is included among a list of about 100 different coating materials that could be used. The patent also lists several seeds that might be coated but applicant cannot find cottonseed listed therein.

KITAMURA et al, U.S. Pat. No. 4,250,660 and MATSUNAGA et al, U.S. Pat. No. 4,067,141 also disclose coating various seeds.

SUMMARY OF THE INVENTION

(1) Progressive Contribution to the Art

I have developed a new process of preparing cottonseed for planting so they will flow out of a bin or hopper, pour out of a bag and feed through a standard planter similar to acid delinted cottonseed, yet leaving all or most of the lint on the seed coat, eliminating the use of acids and alkali, which are pollutants, creating a technique with zero toxic pollution providing flowable planting seed.

The fuzzy cottonseed is prepared by adding and mixing with water, or an aqueous solution prepared with a guar product. This captures the lint and adheres it close into the seed coat. The wetted, prepared seed are run into a dry powdery material to coat and separate the seed from each other for drying and hardening purposes. The result is a coated fuzzy cottonseed with a flowability similar to acid delinted cottonseed. Various adjuvants as catalogued by REDENBAUGH U.S. Pat. No. 4,779,376 may be incorporated in the coating.

Hydroxypropyl guar, a derivative of guar, is particularly suitable as the guar product to be used in the aqueous solution.

As used herein, the term "guar product" includes whole ground guar beans, guar meal, guar gum, and chemically modified guar gum also called chemical derivatives of guar, for example, hydroxypropyl guar. "Jaguar" is a term used by Rhone-Poulenc or its subsidiary Hi-Tek Polymers, Inc. of Louisville, Ky., for identifying many of its guar products.

As used herein, "guar meal" means the ground residue of guar beans after most of the endosperm or guar gum has been removed.

As used herein, "solution" is used in a general sense to include mixtures, dispersion, suspension, etc. as well as chemical solutions. Likewise, "solute" is used to include the material added to the solvent to form the solution.

In this application guar derivative is said to be a solute in the solution. However, it will be understood that the guar gum and the other guar derivatives are primarily a colloid and that they form a colloidal suspension in water. Normally they will be at 3 parts per thousand. The colloidal suspension will be quite thin and liquid. However, at higher concentrations of the colloid in the water they will be more gel like.

As used herein, the term "lubricating" as applied to the solution, means that at a certain viscosity the solution is slick or slimy and when the fuzzy seed with tails are wetted by the solution the tails slide by one another and do not tangle.

As used herein, "grape clusters" means several cottonseed clustered or aggregated together because of the twisted tails.

Guar products are suitable for the dry powdery material to coat the seed.

Also, the dry powdery material to coat the seed is intended to include various inert materials used as fillers, such as calcium hydroxide, clay, or diatomaceous earth, for example. These materials need to be held with a binder. The guar gum and guar derivatives are suitable for use as a binder in the powdery material.

(2) Objects of this Invention

An object of this invention is to coat fuzzy cottonseed so that they may be planted with standard planting equipment.

Another object of this invention is to coat fuzzy cottonseed so that they will flow during handling, storage, and transportation as comparable with acid delinted cottonseed.

A further object is to have a coated cottonseed which has suitable additives therein for beneficial plant growth of the seedlings produced by the seed.

Further objects are to achieve the above with equipment that is sturdy, compact, durable, lightweight, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

Further objects are to achieve the above with a product that is easy to store, has a long storage life, is safe, versatile, efficient, stable and reliable, yet is inexpensive and easy to manufacture and administer.

The specific nature of the invention, as well as other objects, uses, and advantages thereof, will clearly appear from the following description and from the accompanying drawings, the different views of which are not necessarily scale drawings.

Figure 1:
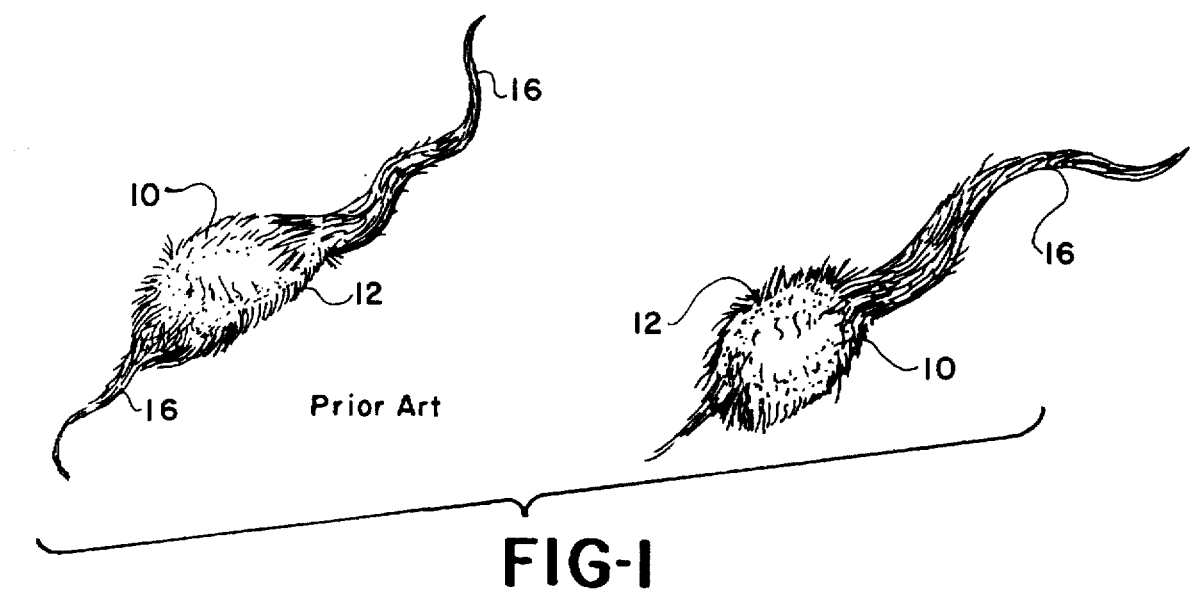
FIG. 1 is an elevational view of fuzzy cottonseed with lint tails thereon.
Figure 2:
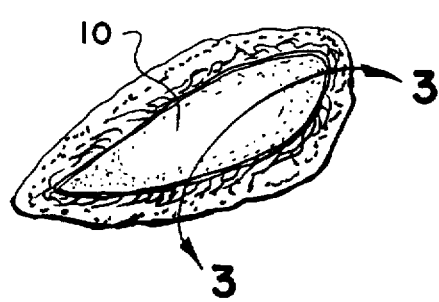
FIG. 2 is an sectional view of a fuzzy cottonseed coated according to this invention.

As an aid to correlating the terms of the claims to the exemplary drawing(s), the following catalog of elements and steps is provided:
10 cottonseed
12 lint fibers
14 seed coat
16 tail
18 coating
20 conditioned outer surface
22 knobby coating

DESCRIPTION OF THE PREFERRED EMBODIMENTS

FIG. 1 shows an individual fuzzy cottonseed 10 with lint fibers 12 remaining from the ginning process still attached to the seed coat 14. Some lint fibers typically extend some length from the seed coat, forming a tuft of fibers called tail 16. The process described herein may be used to produce a coating on fuzzy cottonseed as it comes from the gin. Alternatively, the process may incorporate a first step of partially delinting ginned cottonseed to remove a portion of the fiber tails 16 and fuzzy coating 12. This first step facilitates the subsequent coating process. Lint length reduction may be accomplished by re-ginning, buffing, or flame processes well known in the art. Both non-delinted and partially delinted cottonseed are included in the category called "fuzzy seed".

In the first part of the process, measured amounts of fuzzy cottonseed are fed into a wetting mixer such as a vessel, together with measured amounts of a guar product in aqueous solution. In the one embodiment, the solution comprises about three parts hydroxypropyl guar dissolved in 1,000 parts water by weight. The aqueous solution is added at a rate of 375 ml per 1000 g cottonseed. The thickness of the coating produced later in the process is a function of the amount of aqueous solution with which the seed is wetted.

If the seed has been closely ginned or partially de-linted so there is an absence of the tails 16, the seed may be coated using pure water (no guar product added) to wet the seed. However, more uniform results and better results have been obtained by using hydroxypropyl guar in solution.

It appears if less than about 2 parts of hydroxypropyl guar is used per 1000 parts of water that there will be insufficient lubrication or slickness to the tails to prevent grape clusters from forming. A minimum amount of guar product to prevent grape clusters is needed. As additional amounts of guar products are used in the solution, then additional thickness of aqueous solution will be applied to the seed. It will be understood that mixing as much as about 10 parts of most guar products per 1000 parts of water will produce a gel making it very difficult to apply to the seed. As larger proportions of the hydroxypropyl guar is used in the solution, a thicker final coating will be produced on the cottonseed. It will be understood that although the additional coating is not necessarily harmful, it is not desirable.

It has been found that a coating which is no more than about ⅓ the weight of the uncoated cottonseed is sufficient to cover all the lint and permit the seed to flow well. In fact, it may be that as little as 10% of weight of coating per uncoated cottonseed is sufficient to produce a good product. The thickness of the coating on the seed is calculated as a percentage of the weight of the uncoated seed. I.e., a 25% coating would be considered to be 25 pounds of coating per 100 pounds of un-coated seed, and a 40% coating would be considered to be 40 pounds of coating per 100 pounds of un-coated seed. Good success is had with about a 33% coating, but also it seems to be acceptable to use from about a 25% to a 40% coating. However, in many respects, coatings within the range even of 10% to 80% coating might be acceptable.

Wetting with 375 parts of solution per 1000 parts of un-coated seed seem to produce about a 33% coating. The amount of solution per seed to obtain the desired seed coating thickness is readily determined by experimentation considering the exact solute used, the amount of solute, and also the exact powdery coating material used.

Good results have been obtained using Jaguar 8000, a product of Hi-Tek Polymers, Inc., as the solute to form the wetting solution. Also, good results have been obtained using Jaguar 8600, a product of Hi-Tek Polymers, Inc., or Jaguar 8920, a product of Rhone-Poulenc. The above identified materials are all guar derivatives, specifically hydroxypropyl guar.

Satisfactory results have been obtained by using Jaguar 2015, Jaguar 2100, Jaguar 2201, products of Hi-Tek Polymers, Inc., and Jaguar 2101, a product of Rhone-Poulenc. These products are all guar gum and used as the solute.

Inside a wetting mixer cottonseed and aqueous solution are mixed by a paddle or by an auger or tumble drum, by rotating or tumbling the wetting mixer, by a combination of these, or by other suitable means. The cottonseed may be wetted by a shower, spray, or measured in injection of aqueous solution. The cottonseed may be wetted and then mixed by an auger or by other means in a continuous process.

Normally, when wet fuzzy cottonseed is mixed, lint and particularly the tails on individual seeds become twisted and entwined with the lint on other seeds, causing the seeds to cluster together, forming undesirable masses of seeds called "grape clusters." Wetting by the hydroxypropyl solution identified above lubricates or makes the fibers slippery so that they do not become entangled, thus reducing or eliminating the problem of seeds aggregating into clusters. The solution also acts as a surfactant which counteracts the natural water-resistance of the raw cotton fiber, allowing the lint and the seed surfaces to be thoroughly wetted.

After sufficient mixing to wet the seeds and the attached fiber, wet seed is discharged from the wetting mixer. Next, the wet seed is fed into a coating apparatus, which contains a guar product in dry powdered form. In one embodiment, the powdered guar product is hydroxypropyl guar, a polymer, i.e., the same polymer as used in the wetting solution above.

All of the solutes listed above are suitable for the dry powdery material. Good results have been obtained by using Jaguar 2101. In addition to the products listed above, whole ground guar beans are suitable as a dry powdery material and probably the commercially preferred material because of raw material costs.

Also, it is possible to add "fillers" to the coating. Such fillers might be non-abrasive substances such as, clay, ground limestone, or diatomaceous earth. It is necessary that anything to be used as a filler be compatible with the cotton seedling produced by the cottonseed and, also that it be non-abrasive. An abrasive filler would cause problems in the planting mechanism. If a filler is used, it is also necessary to limit the filler to what can be readily bound by the guar product, which in this case would act as a binder. Guar meal is considered a suitable filler.

The hydroxypropyl guar is probably the preferred coating material for producing the optimum coating 18. The coating 22 produced by whole ground guar beans will be rough or "knobby" from the presence of ground bean coat or hull.

The coating apparatus or mixer contains an excess of powdered coating material to ensure that each seed becomes thoroughly coated with powder, and to facilitate mixing of the wet seed with the dry powder. Seed and powder are mixed by rotating or tumbling the coating mixer, by stirring, or by other appropriate means.

A characteristic of the guar products is that they become cohesive when wetted, so that the powdered guar product clings to the wetted seeds. The first portion of wetted powder on the seed surface forms a sticky gel to which the lint fibers attached to the seed adhere. Additional dry powdered guar derivative is attracted to the sticky gel, so that the layer of moist powder on each seed becomes thicker. Thus the fibers attached to the seed are captured or confined within the layer of moist powder, with a greater portion of the fiber being near the seed surface, and a lesser portion of the fiber being near the surface of the polymer coating. The lint fibers also reinforce the coating by being fibers in the composite coating. For good, even coating, the seed must have lint on its entire seed coat. The adherence of the coating onto the seed is dependent on the presence of lint fibers.

Also it will be understood that when cottonseed are wet, even with pure water and more particularly with a solution as described above, the lint fuzz on the seed will lay close onto the seed coating. This is much the same as the hair on an animal will lay close to the skin when wet.

Other desirable seed-treating agents such as fertilizers, root stimulants, systemic insecticides, etc., (listed in the REDENBAUGH patent above as adjuvants) may be mixed with the guar derivative to be incorporated into the seed coating.

From the coating mixer, the coated seed together with the excess dry powdered coating material are moved onto a screen or a shaker screen having a mesh size smaller than the coated seed, thereby allowing the excess powder to fall through the screen and be collected for reuse.

Next, the coating on the seed is dried by passing the seed on a moving screen through a stream of heated air. Because the seed quality is reduced by exposure to high temperatures, it is desirable not to heat the interior of the seed to temperatures greater than 120° F. Therefore the temperature of the drying chamber and residence time of the seed within the drying apparatus are governed by the amount of heat required to dry the coating without excessively heating the seed. Good results have been achieved with an air temperature of about 140° F.

As it dries, the coating on the seeds decreases in thickness and becomes harder. When the coating is completely dried, it forms a friable or chalky coating on each seed which will withstand normal handling by cottonseed planting equipment. The seed are single after drying, that is, they are separate, unitary seed. Because the coating material is very finely divided, the coating is chalky, i.e., somewhat crumbly and having a dusty surface.

Figure 3:
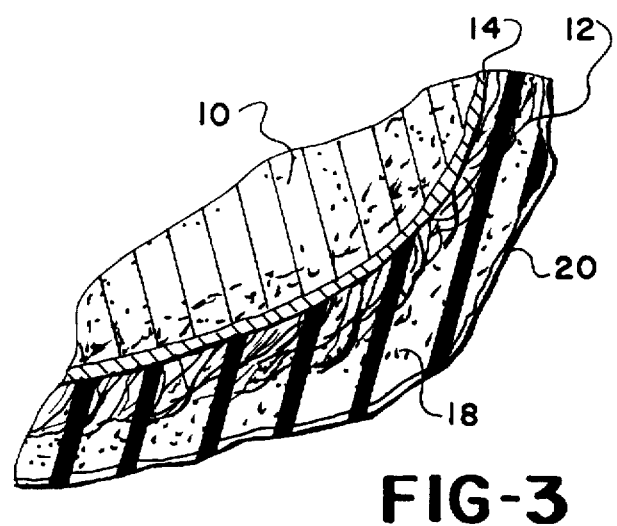
FIG. 3 is an enlarged portion of a section of FIG. 2, particularly showing the edge of the cottonseed with the seed coat, lint coating, and the conditioned outer surface of the coating.
Figure 4:
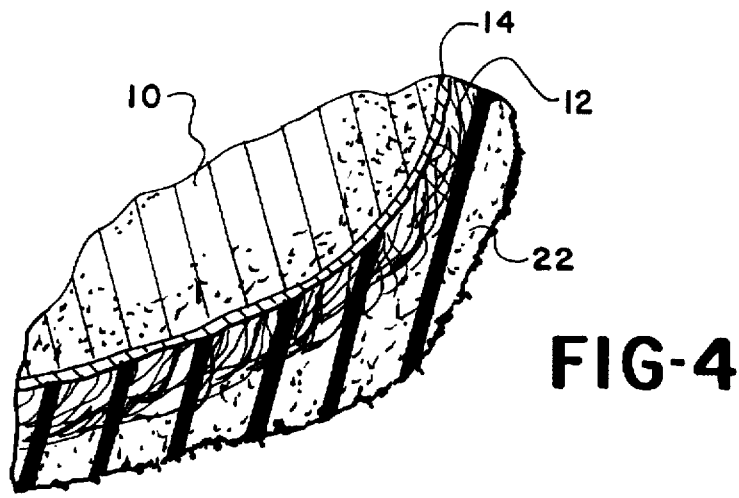
FIG. 4 is similar to FIG. 3 showing a coating of ground guar beans with no conditioner on the outer surface.

It is contemplated that loss by dust from the surface of the coating on the seed may be reduced by the addition of small amounts of binder or conditioning agents to the surface of the coating. Such binders or conditioning agents also serve to strengthen or toughen the surface of the coating. A standard drum seed treater, within which the binders or conditioning agents are applied to the coated seed, may be used. A detail showing the seed coat 14, the applied coating 12, and a conditioned surface 20 of the coating are shown in FIG. 3.

The process produces cottonseed having a coating 18 or 22 which encapsulates the lint 12 attached to the seed 10. The coating allows the individual seeds to slip easily around and past each other, so that a quantity of the coated seed becomes flowable, i.e., capable of being moved by gravity or by mechanical means much like corn, wheat, or other grains. If the coated seed are not treated with an external binder or sealant, the dust will have a dry, lubricating effect.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. The method of coating gin-run fuzzy cottonseed comprising the steps of:
    a) wetting seed, thereafter
    b) applying an excess of powdered coating material to the wetted seed, said coating material comprising a water-soluble material.

2. The method as defined in claim 1 further comprising:
    c) after applying an excess of powdered coating material, then screening the seed to remove excess of the powdered coating material.

3. The method as defined in claim 1 further comprising:
    c) before wetting the gin-run fuzzy seed,
    d) mechanically reducing the length of the lint on the coated gin-run fuzzy cottonseed.

4. The method as defined in claim 1 further comprising:
    c) wetting the seed with a lubricating material in water to form a solution to reduce formation of grape clusters.

5. The method as defined in claim 4 wherein
    d) said solution comprising at least two parts of hydroxypropyl guar to a 1000 parts of water by weight, thus producing a slick, non-cohesive attribute to said coated gin-run fuzzy cottonseed.

6. The method as defined in claim 5 further comprising:
    e) said powdered coating material includes a derivative of guar.

7. The method as defined in claim 5 wherein
    e) said powdered coating material is whole ground guar beans.

8. The method as defined in claim 5 wherein
    e) said water soluble powdered coating material is a guar product.

9. The method as defined in claim 8 further comprising:
    f) drying the coated product, to produce single seed with a powdery coating.

10. The method as defined in claim 9 wherein
    g) the coating is within the range of about 10% to about 80% of the seed weight.

11. The method as defined in claim 8 further comprising:
    f) applying a conditioner of water soluble material after said seed have been coated,
    g) said conditioner binding the outer surface of the coating.

* * * * *